(12) United States Patent
Grobbel

(10) Patent No.: US 12,393,740 B2
(45) Date of Patent: Aug. 19, 2025

(54) METHODS AND DEVICES FOR SECURE ACCESS CONTROL TO A DATA STORAGE SYSTEM AND FOR DATA ARCHIVING

(71) Applicant: Swissbit AG, Bronschhofen (CH)

(72) Inventor: Hubertus Grobbel, Munich (DE)

(73) Assignee: Swissbit AG, Bronschhofen (CH)

( * ) Notice: Subject to any disclaimer, the term of this patent is extended or adjusted under 35 U.S.C. 154(b) by 207 days.

(21) Appl. No.: 18/065,993

(22) Filed: Dec. 14, 2022

(65) Prior Publication Data

US 2023/0237205 A1 Jul. 27, 2023

(30) Foreign Application Priority Data

Dec. 14, 2021 (DE) ..................... 10 2021 133 155.2
Feb. 9, 2022 (DE) ..................... 10 2022 201 339.5

(51) Int. Cl.
  *G06F 21/78* (2013.01)
  *G06F 21/60* (2013.01)
  *G06F 21/62* (2013.01)

(52) U.S. Cl.
  CPC ............ *G06F 21/78* (2013.01); *G06F 21/602* (2013.01); *G06F 21/6209* (2013.01)

(58) Field of Classification Search
  CPC ...... G06F 21/44; G06F 21/602; G06F 21/604; G06F 21/606; G06F 21/6209;
  (Continued)

(56) References Cited

U.S. PATENT DOCUMENTS 7,171,687 B2 * 1/2007 Uemura ............. H04N 21/2543
    348/E7.071
2001/0028523 A1 * 10/2001 Moro ................... G06F 11/1068
    714/E11.038
(Continued)

OTHER PUBLICATIONS

"IPsec," Wikipedia, Last Updated Dec. 5, 2021, retrieved from https://en.wikipedia.org/w/index.php?title=IPsec&oldid-1058732052, 8 pages.
(Continued)

*Primary Examiner* — Michael Simitoski
(74) *Attorney, Agent, or Firm* — Sheridan Ross P.C.

(57) ABSTRACT

A method for secure access control to a data storage system for a host apparatus by means of an access control device, the method comprising: as part of a first mode of operation of the access control device, receiving user data from the host apparatus and transmitting it in unmodified or modified form to the data storage system for local storage; exchanging a first cryptographic secret with a computer system to enable encryption of data by the access control device in dependence on the first cryptographic secret; receiving a data read request for at least a portion of the user data stored in the data storage system; in response to the data read request, transitioning the access control device to a second mode of operation in which the access control device is configured to perform read access but not write or delete access to the data storage system; and in the second operating mode, retrieving user data requested according to the data read request from the data storage system, encrypting them using the first cryptographic secret (K) or a key derived therefrom according to a key generation rule and transmitting the user data encrypted in this way to a predetermined user data recipient; wherein the user data is processed as part of the method in such a way that the encrypted user data transmitted as part of the second operating mode represents information which
(Continued)

can be extracted from it for the user data recipient and which represents an identity of the access control device and/or of the data storage system or allows a clear conclusion to be drawn therefrom.

26 Claims, 7 Drawing Sheets

(58) Field of Classification Search
CPC .. G06F 21/6218; G06F 21/78; G06F 11/1402; G06F 11/1446; G06F 11/1456; G06F 11/1471; G06G 3/062; G06G 3/0622; H04L 63/0464; H04L 63/0471; H04L 9/0822; H04L 9/0825; H04L 9/14; H04L 9/3271

See application file for complete search history.

(56) References Cited

U.S. PATENT DOCUMENTS

| | | | | |
|---|---|---|---|---|
| 2002/0016912 A1* | 2/2002 | Johnson | ............... | H04L 63/062 713/165 |
| 2004/0085446 A1* | 5/2004 | Park | ............... | H04N 21/4408 348/E7.056 |
| 2007/0091177 A1* | 4/2007 | West | ............... | H04N 5/76 348/E5.042 |
| 2008/0066184 A1* | 3/2008 | Ben-Ami | ............... | H04L 9/3242 726/27 |
| 2011/0016319 A1* | 1/2011 | Lundberg | ............... | H04L 9/0819 713/170 |
| 2014/0040639 A1* | 2/2014 | Raam | ............... | G06F 21/78 713/193 |
| 2014/0334611 A1* | 11/2014 | Barnes | ............... | H04M 3/51 379/68 |
| 2017/0038994 A1* | 2/2017 | Ohhashi | ............... | G06F 12/14 |
| 2018/0295111 A1 | 10/2018 | Iizuka et al. | | |

OTHER PUBLICATIONS

"Hybrid cryptosystem," Wikipedia, Last Updated Jan. 13, 2021, retrieved from https://en.wikipedia.org/w/index.php?title=Hybrid_cryptosystem&oldID=1000086473, 2 pages.

"Session key," Wikipedia, Last Updated Nov. 26, 2021, retrieved from https://en.wikipedia.org/w/index.php?title=Session_key&oldid=1057216023, 2 pages.

* cited by examiner

METHODS AND DEVICES FOR SECURE ACCESS CONTROL TO A DATA STORAGE SYSTEM AND FOR DATA ARCHIVING

CROSS-REFERENCE TO RELATED APPLICATIONS

This application claims the benefit of German Application No. 10 2021 133 155.2 filed Dec. 14, 2021, and German Application No. 10 2022 201 339.5 filed Feb. 9, 2022, the contents of each of which are incorporated herein by reference in their entireties.

TECHNICAL FIELD

The present invention is in the field of data protection and relates, on the one hand, to a method for secure access control to a data storage system for a host apparatus using an access control device as well as to an access control device configured to carry out the method. On the other hand, the invention relates, in particular as a further component of an overall system for data backup and archiving described herein, to a data archiving method as well as to a data archiving device configured to carry it out. In addition, the invention relates to computer program (products) for executing the aforementioned methods. While the invention can be used in connection with a wide variety of applications, it can be used in particular in connection with recording systems in order to achieve secure access and possibly secure archiving of recording data obtained by means of such a recording system. Therefore, the application of the invention in connection with recording systems will be discussed in more detail below by way of example and without this being to be understood as a limitation. Other applications in which it can be used are, in particular, data backup or archiving of backup data for computer systems, offloading of data from an internal storage of a computer system to an external data carrier, archiving of system log data from computer systems for forensic purposes and archiving of sensor data related to billing, for example with regard to consumption bills for gas, electricity, water or other consumer goods.

BACKGROUND

Recording systems of various types are regularly used to detect recording data and to keep them stored until later processing. Such recording systems can in particular be or comprise photo or video cameras, audio recording apparatus such as dictation machines, data loggers for sensor data, in particular with regard to the so-called "Internet of Things" (IOT), or other monitoring systems, for example for monitoring machines or public places or buildings or safety-relevant areas, as components of the recording system.

On the one hand, there are recording systems that are permanently installed at a specific location, and on the other hand, there are recording systems that are mobile devices and which can therefore be operated at a wide variety of locations. For example, permanently installed video recording devices can be used in real estate for factory security, for monitoring security areas, and/or for property protection. Due to their fixed installation, data lines are then often present which do not require local storage of recording data obtained with the recording system in the recording system itself. In addition, with such a permanently installed recording system, a loss of the recording system is less likely and in terms of data protection due to the lack of local data storage usually less serious than with mobile recording devices with their own data storage for the recording data. The existence of a permanent place of use can also make it easier to assess the use permit for fixed recording systems.

The situation is different for mobile recording systems. Examples of mobile recording systems are cameras, video cameras, body cams, dash cams, etc. When such recording systems are operated in public areas, they can potentially be easily lost or stolen.

A recording system typically has a storage interface for accessing a data storage system, which can be permanently integrated into the recording system or easily replaceable, in particular in the form of a removable data carrier such as a memory card or a memory stick.

Normally, such recording systems are not equipped in itself to provide the data to be stored with access protection, such as encryption or an authentication function, because this requires additional computing power and expenses for access protection, in particular also for a key exchange with regard to encryption, or a significantly more complex operation would have to be accepted.

While the need for data recording of all kinds is constantly increasing in many areas, such as in the area of security services, rescue services, protection systems for taxi drivers or bus drivers or in the area of industrial measurement and monitoring technology, for example with regard to continuous temperature monitoring of a cold chain, of energy consumption data for assigned invoicing and much more, such data recordings often have to meet high requirements for the associated data protection.

Data protection typically and often necessarily begins at the source of the data, followed by secure archiving, ensuring that further processing is exclusively related to specific events, and secure deletion of data that is not required.

The implementation of the requirements for legally compliant data processing therefore regularly requires a data protection concept, because recording data can often only be used if they have been recorded properly. Sufficient precautions must also be taken against the loss of data, which may affect the rights of persons in the recordings, and such a loss is often heavily sanctioned.

BRIEF SUMMARY

It is an object of the invention, in particular with regard to the data protection that can be achieved thereby, to specify improved methods and devices for secure access control with regard to data, in particular recording data.

The solution to this problem is achieved according to the teaching of the independent claims. Various embodiments and refinements of the invention are the subject matter of the dependent claims.

A first aspect of the solution relates to a method, in particular a computer-implemented method, for secure access control to a data storage system for a host apparatus by means of an access control device. The data storage system can in particular be a removable storage medium and have one or more (data) storage media. The method includes:
  (i) as part of a first operating mode of the access control device, receiving user data from the host apparatus and transmitting of the same in unchanged or modified form to the data storage system for local storage.
  (ii) exchanging (at least unidirectionally) a first cryptographic secret with a computer system, in particular a predetermined one, in order to enable data to be encrypted by the access control device as a function of the first cryptographic secret;

(iii) receiving a data read request, in particular from the computer system, with regard to at least part of the user data stored in the data storage system;
(iv) in response to the data read request, transitioning the access control device to a second mode of operation in which the access control device is configured to perform read access but no write or erase access to the data storage system; and
(v) in the second operating mode, retrieving user data requested in accordance with the data read request from the data storage system, encrypting them using the first cryptographic secret or a key derived therefrom in accordance with a key generation rule (as a key or key component) and transmitting the user data encrypted in this way to a predetermined user data receiver, such as the computer system or a (different) data reading and/or data archiving system.

As part of the method, the user data is processed in such a way that the encrypted user data transmitted in the second operating mode represents information that the user data recipient can extract from it without decrypting the user data, which represents an, in particular unambiguous, identity of the access control device and/or of the data storage system or allows a clear conclusion to be drawn therefrom.

The identity can be represented, for example, by (i) the inclusion of identifier information in the user data itself or (ii) as (meta) information impressed on the user data to be encrypted as part of the encryption, which information can be recovered during decryption. In the first case (i), a cryptogram of the user data is obtained, which encrypts the actual user data (without the identifier information) and, on the other hand, contains the identifier information in plain text that can be read without decryption. In the second case (ii), the identifier information is impressed onto the user data encrypted as a cryptogram in such a way that it can be extracted from the cryptogram without the user data itself having to be decrypted for this purpose. This can be done, for example, by predetermining one or more specific mathematical functions which, when applied to the cryptogram, extract the identifier information. In a simple case, such a function could be defined, for example, using a checksum over all or a specific selection of the symbols (eg bits or multi-value symbols) of the cryptogram.

It is within the scope of the invention for the sub-processes (i) to (v) of the method described above, unless otherwise stated or due to the mandatory precedence of a sub-process in relation to another sub-process that is based on it or if it is technically impossible or nonsensical, to be carried out in another order and/or that sub-processes are combined and/or a sub-process is integrated into another sub-process.

The term "data storage system", as used herein, means a device or a system consisting of several devices that has the ability to store data in or on at least one storage medium of the data storage system in such a way that the data is written in the system during operation of the data storage system in the context of write accesses, that the data is read from the system as part of read access and that the data is deleted (or marked as overwriteable) as part of delete access. In particular, hard disk memories or semiconductor memories or memory modules provided with semiconductor memories or storage devices are data storage systems within the meaning of the invention. This applies in particular to volatile semiconductor memory (volatile memory, VM, e.g. SRAM, DRAM) and above all to non-volatile memory (non-volatile memory, NVM, e.g. Flash) and for VM or NVM based on innovative materials, such as for Ferroelectric RAM (FRAM, FeRAM), Magnetoresistive RAM (MRAM), Phase Change Memory (PCM), Phase-change RAM (PCRAM), Chalcogenide RAM (C-RAM), Ovonic Unified Memory (OUM), Programmable Metallization Cell (PMC), Organic RAM (ORAM), Conductive Bridge RAM (CBRAM), Nanotube RAM (NRAM), and Racetrack-Memory.

The term "access control device", as used herein, is to be understood in particular as a device or a system consisting of several devices that has the ability to process received data, for example in the context of cryptographic encryption or decryption or coding, or address management, and to act as a data interface between a host apparatus and a data storage system in order to provide access control, in particular access protection, with regard to data to be written to, read from, the data storage system, and/or data to be deleted therein.

The term "secured access control to a data storage system" (and modifications thereof), as used herein, is to be understood in particular as a control of access, in particular for writing, reading or deleting data with regard to the data storage system, which is designed in such a way that such an access is secured by means of access protection, so that only access that qualifies for access protection is possible. Such access protection does not necessarily have to be provided for all the types of access mentioned. For example, writing data into the data storage system could be done without access protection while reading out and/or deleting already stored data would only be possible for access qualified for access protection. Such access protection can in particular be cryptographic encryption and/or granting access only after prior authentication, for example by means of a PIN or biometric user identification.

The term "host apparatus" as used herein is to be understood in particular as a device that can access the data storage system used in the context of the method via an access path running through the access control device. The host apparatus can in particular be a recording device, such as a camera, in particular a video camera, an audio recording apparatus, a data logger or quite generally any device acting as a data source, in particular a sensor device. For access to the data storage system, in particular for storing recording data therein, it can have a data interface for the at least unidirectional exchange of data with the access control device. In particular, the data interface can be configured for data exchange via a physical connection (such as via a slot) between the host apparatus and the access control device or a device containing the access control device.

The term "computer system" as used herein means a device or system that has a data processing functionality and normally has at least one processor, in particular a microprocessor, for this purpose. Known examples of computer systems are in particular personal computers of any type and servers. The computer system can be designed in particular based on its role as a key server, i.e. as a server that can be reached via a communication network such as the Internet or a secure line, which server in particular has the task of providing a secret required for decrypting the encrypted user data to one or more authorized recipients.

The term "user data" as used herein refers in particular to data transported during communication between at least two communication partners (in this case in particular between at least two of the following: host apparatus, access control device, data storage system, computer system, user data recipient), in particular one or more data packets that contain no control or protocol information. User data include Speech, text, characters, images (moving and still) and sounds.

A "modified form" of user data can result in particular from cryptographic encryption. In the case of image data as user data, it can result in particular from image processing, such as segmentation, sector selection, filtering or a change in resolution or compression of such image data. If the storage medium in which the user data is to be stored is block-oriented, so that each memory block has an address and a predefined size (e.g. 512 bytes), then the modified form of the user data can also result from reformatting, for example, in which the user data is divided into data blocks and a specific memory block or its addresses are uniquely assigned to each data block according to an assignment scheme or an assignment algorithm. Several different data processing methods, in particular those mentioned above, can also be used in combination in order to bring the user data into their modified form, if necessary.

The term "cryptographic secret" or "secret" for short, as used herein, is to be understood in particular as information that is used as part of cryptographic encryption or decryption or signature or signature verification as a cryptographic key or component or such or as, in particular, secret generator information to generate such a key or key component. While in many cases the secret should or must be kept secret from unauthorized third parties or, in the case of asymmetric encryption, even from the communication partner of an encrypted communication in order to achieve the desired protection, this is not valid in all cases. In particular, the secret can also correspond to a public key of the recipient as part of an asymmetric encryption and to the public key of the sender as part of a verification of a signature.

As possibly used herein, the terms "comprises," "contains," "includes," "has," "have," "having," or any other variant thereof, as appropriate, are intended to cover non-exclusive inclusion. For example, a method or apparatus that comprises or has a list of elements is not necessarily limited to those elements, but may include other elements that are not expressly listed or that are inherent in such method or apparatus.

Further, unless expressly stated to the contrary, "or" refers to an inclusive or and not to an exclusive "or". For example, a condition A or B is met by one of the following conditions: A is true (or present) and B is false (or absent), A is false (or absent) and B is true (or present), and both A and B are true (or present).

The terms "a" or "an" as used herein have the meaning of, one or more". The terms "another" and "a further" and any other variant thereof are to be understood to mean "at least one other".

The term "plurality" as used herein is to be understood to mean "two or more". The term "configured" or "set up" to perform a specific function (and respective modifications thereof) is to be understood in the meaning of the invention that the corresponding device is already provided in a design or setting in which it can execute the function or it is at least settable—i.e., configurable—so that it can execute the function after corresponding setting.

The configuration can take place, for example, via a corresponding setting of parameters of a process course or of switches or the like for activating or deactivating functionalities or settings. In particular, the device can have multiple predetermined configurations or operating modes, so that the configuration can be carried out by selecting one of these configurations or operating modes.

The method according to the first aspect offers in particular the possibility that access protection does not have to be implemented in the host apparatus itself. Instead, it is now possible to use conventional host apparatus without their own data or access protection function, in particular as recording devices, and instead to provide the data or access protection function externally in the data flow between the host apparatus and the data storage system using the access control device. In particular, this also enables an improvement in the protection that can be achieved with the continued use of conventional host apparatus, in particular those already used and/or installed in the field without having to modify them.

Encrypting the user data with a cryptographic secret, which only becomes available in conjunction with the (external) computer system for decrypting the encrypted user data, contributes to the protection concept, as does the interaction between the two operating modes, because the encrypted user data read out in the second operating mode allow an unambiguous conclusion as to the identity (depending on the implementation) of the access control device and/or of the data storage system. In addition, it is ensured that the person or entity who is granted access to the user data in the second operating mode cannot take any measures that change the user data in the data storage system because the second operating mode does not allow write or delete access.

Preferred embodiments of the method according to the first aspect are described hereinafter, which in each case, unless expressly excluded or technically impossible, can be combined as desired with one another and with the further described other aspects of the invention.

In some embodiments, exchanging the first cryptographic secret includes directly or indirectly transmitting identification or authentication information to the computer system for identifying or authenticating the access control device and/or of the data storage system versus the computer system. This is particularly advantageous with regard to protecting the exchange of the first cryptographic secret, since a security-endangering exchange involving an unauthorized party, such as another, unauthorized, data storage system, can be effectively prevented by the computer system verifying the identification or authentication information and, in the case of successful identification or authentication, enabling the exchange, although it can otherwise prevent it. It is also possible for the computer system to transmit a result of the test to the access control device and for the access control device itself to control its participation in the exchange of the first cryptographic secret depending on the test result so that this only takes place in the event of successful identification or authentication.

In some of the foregoing embodiments, a computer system defined challenge information is received (by the access control device). In response to the receipt of the challenge information and as a function of the challenge information and a predetermined second cryptographic secret, response information is generated according to a predetermined response generation rule and is transmitted to the computer system as part of the identification or authentication information. In addition, the exchange of the first cryptographic secret also includes receiving the first cryptographic secret or a partial secret required according to a predetermined key exchange protocol for generating the first cryptographic secret in a form that can be decrypted using the second cryptographic secret. The exchange of the first cryptographic secret can therefore take place specifically as a function of an upstream challenge-response scheme. The actual exchange of the first secret or the information required to generate it (partial secret) then takes place only after successful verification of the reaction or response to the challenge information transmitted to the computer system in the form of the response information. The response information is also protected as a function of the second cryptographic secret, in particular to protect against eavesdropping or manipulation during transmission (so-called "man-in-the-middle" attack), which can occur in particular by cryptographic encryption with and/or signing with the second secret as a key. In the case of asymmetric encryption, the second secret can correspond in particular to a public key of the other party, in particular of the computer system.

The aforementioned embodiments are based in particular on an interaction between the access control device and the computer system. Since the computer system will in many cases be connected to the access control device "online", ie via at least one communication network, eg the Internet, the aforementioned embodiments can also be referred to as "online" variants of the method according to the first aspect.

The following protocols, which are as such known to those skilled in the art, should be mentioned as possible examples of the key exchange protocols mentioned: (i) with regard to symmetric encryption "Merkle's Puzzle", (ii) with regard to asymmetric encryption the "Diffie-Hellman key exchange", or (iii) for key exchange and authentication in a decentralized network, the "Needham-Schroeder protocol", which can be used with regard to both symmetric and asymmetric encryption.

Specifically, in some of these embodiments, the second cryptographic secret is used as one key of an asymmetric key pair that:
(a) is used, for generating the response data as a public key of the computer system (ie for encryption) and for decrypting (decrypting) the received first cryptographic secret or partial secret as a private key of the data processing system and/or data storage system. This case (a) can therefore be referred to as a "cipher case".
(b) cumulatively or alternatively, the second cryptographic secret can be used as a key for generating the response data as a private key of the data processing system (i.e. for signing the response data) and/or of the data storage system and for decrypting the received first cryptographic secret or partial secret as a public key of the computer system (ie for verifying a signature of the computer system). One can therefore define this case (b) the "signing case".

Accordingly, in these embodiments, the second secret is used to provide protection in the sense of cryptographic encryption and/or signature of the response information.

In some embodiments, the second cryptographic secret is used as a symmetric encryption key used to decrypt the first cryptographic secret or partial secret received and encrypted with the second cryptographic secret. Here, the exchange of the first secret is additionally protected based on the cryptographic use of the second secret.

In each embodiment using it, the second secret can be stored in particular in the access control device, for example already during its manufacture or ex works.

In some embodiments, exchanging the first cryptographic secret includes receiving a cryptogram containing the first cryptographic secret or a partial secret required to generate the first cryptographic secret according to a predetermined key exchange protocol, the cryptogram being decryptable using the second cryptographic secret. In particular, the cryptogram can be generated by the computer system and transmitted directly or indirectly. These embodiments therefore also represent "online" variants of the method according to the first aspect.

In some embodiments, exchanging the first cryptographic secret comprises: (i) generating the first cryptographic secret; (ii) encrypting read access data using a predetermined third cryptographic secret, the read access data being determined in such a way that they represent the first cryptographic secret or a partial secret required according to a predetermined key exchange protocol for generating the first secret, and the encrypted read access data being decryptable using a fourth cryptographic secret known to the computer system; and (iii) transmitting the encrypted read access data and at least one identity of the access control device and/or of the data storage system to the computer system to provide it with the first cryptographic secret and identity.

The term "read access data", as used herein, is to be understood in particular as data that enable another entity, in particular the computer system, or at least contribute to such an enabling, to read user data read out of the data storage system. If such user data is encrypted with the first secret, for example as part of a symmetrical encryption, then the read access data can have the symmetrical key or a partial secret required for its generation, so that the above entity, if it receives the read access data in a readable form, in particular in a decryptable form, can read the encrypted user data when it is transmitted to the entity.

In particular, these embodiments enable the implementation of a scenario where active participation of the computer system is not required for archiving the encrypted user data read from the data storage system in the second operating mode in a data archiving system that is different from the data storage system. Rather, the role of the computer system can be limited here, in view of a decryption of the archived encrypted user data, to providing the key for decryption that is required for decrypting the archived encrypted user data and which was previously received by the computer system using the read access data. The transmission of the read access data to the computer system can even be designed in such a way that it only takes place when the computer system requests the transmission from the access control device, in particular only when the computer system receives a request to provide the first secret, for example from a data archiving system or a data protection officer with appropriate authorization. A communication link between the access control device and the computer system is therefore not required beforehand. These embodiments can thus also be referred to as "offline" variants of the method according to the first aspect. In particular, the third secret can correspond to the second secret. The fourth secret can correspond to the third secret, particularly in the case of use as part of symmetrical encryption, or to a secret key of the computer system as part of asymmetrical encryption. It is also possible that the third cryptographic secret and the fourth cryptographic secret together form an asymmetric key pair and the third cryptographic secret for encrypting the read access data is used (in particular for signature purposes) as a private key of the access control device or (in particular for encryption purposes) as a public key of the computer system.

Instead, however, the third cryptographic secret and the fourth cryptographic secret can define the same cryptographic key, which is used as a symmetric key for encrypting the read access data.

The complexity and security of the implementations, in particular also with regard to the number of different secrets required and—if necessary—their exchange (eg key exchange) can be adapted depending on the requirement and the selection of the previously mentioned options for these embodiments.

In some of the offline variants of the method, this also includes receiving a time signal representing a current time. In particular, this can be closely related in terms of time to the generation of the first cryptographic secret or the read access data or the writing of the user data to the data storage system. In addition, the read access data are determined in such a way that they also represent a current time indication represented by the time signal. The time signal is expediently received from a data source that can be classified as very reliable.

On the basis of the time specification, it is possible in particular to define a predetermined period of validity for the user data that is restricted to a limited period of time. The computer system can use this to determine whether decryption of the encrypted user data output by the access control device as part of the second operating mode using the first secret obtained from the read access data is permissible or inadmissible with regard to the time specification and the period of validity. In the event of inadmissibility, the issuing of the first secret can then be prevented or the first secret can even be destroyed in order to make decryption in this way practically impossible or at least drastically more difficult. In some embodiments, the method further comprises: in response to the data read request: (i) redetermining the first cryptographic secret to be uniquely associated with this data read request (ie, different from the first secrets for other data read requests); (ii) setting an index value such that this index value is uniquely associated with this (ie not another) data read request (and thus the associated first secret); (iii) transmitting data representing the set index value to the user data receiver; (iv) determining the read access data to also represent the set index value; and (v) using the first secret associated with the current index value to encrypt the user data to be output as part of the second operating mode.

A solution can thus be achieved in which different first secrets are used for different read accesses within the scope of the second operating mode, so that each of these read accesses uses its own, individually assigned first secret in order to encrypt the user data to be output. With the help of the index value, which is made accessible to the user data recipient, this can, if necessary, request the first secret that matches the index value from the computer system as part of a read request for the purpose of decrypting the associated user data, with the computer system having received this first secret, including its assignment to the index value based on the read access data and therefore it also being available in order to be able to meet the requirement, for example of an archiving system in which the encrypted user data is archived.

The index value can be implemented in particular as a counter value of a counter, in particular a unidirectional counter, so that there is a strictly monotonic association between the counter value and the sequence of consecutive read requests. This allows a particularly efficient and secure implementation.

In some embodiments, the method further comprises: (i) receiving a data write request, particularly from the computer system, for user data to be written to the file storage system; (ii) in response to the data write request, transitioning the access control device to a third mode of operation in which the access control device is configured to have write access to the data storage system but not read access to user data previously written therein; (iii) receiving user data to be written in encrypted form using the first cryptographic secret; (iv) decrypting the received user data to be written using the first cryptographic secret or a key determined as a function thereof according to a predetermined key generation rule; and (v) while the access control device is in the third operating mode, transmitting the user data to be written, decrypted in this way, in unchanged or modified form to the data storage system for local storage.

The third operating mode thus allows secure write access to the data storage system via the access control device. In some variants of this, the third operating mode can at least substantially correspond to the first operating mode if this also meets the aforementioned conditions. The data to be written as part of the write access in the third operating mode can, but does not have to, come from the host apparatus.

In addition, it can be provided here that the method also includes a verification of the data write request. In this case, user data to be written according to the data write request is transmitted in unmodified or modified form to the data storage system for local storage only if the data write request has previously been successfully verified.

In some embodiments, the method also includes verifying the data read request, wherein user data requested according to the data read request is only transmitted if the data read request has previously been successfully verified, for example via a password or PIN query. In particular, in these embodiments, the verification can include receiving authentication data from a device or from a user of the device from which the data write request or the data read request originates. The verification is then based on the received authentication data.

The security of the (write or read) access to the data storage system can be further increased on the basis of the verification. This can occur, in particular also in all of the aforementioned cases, for example, using a password such as a PIN.

In some embodiments, user data is received from the host apparatus via at least one input interface of the access control device and the encrypted user data read out in the second operating mode is transmitted to the predetermined user data recipient exclusively via at least one output interface of the access control device that is different from each input interface. Thus, the receiving of the user data from the host apparatus and the outputting or transmission of the encrypted user data that has been read out can also be physically separated from one another in the second operating mode, which can be used to further increase the achievable data protection. In particular, a separate treatment of the security factors (i) access to data and (ii) access to keys for decrypting the data can be implemented in this way. These security factors or roles can lie with different users or entities, in any case in such a way that the key is not available to every user, with at least one of the users not being able to access both interfaces or at least not being able to access the stored data via both interfaces. This also enables improved data protection in connection with so-called offsite backups, such as data archiving in a cloud environment (in the role of a data archiving device).

In some embodiments, the access control device is or will be configured in the second operating mode in such a way that the access control device prevents further user data to be written to the data storage device from being received until the encrypted user data read out in response to the data read request has been transmitted to the user data receiver, e.g. the computer system or a data archiving device, or where applicable, a failed verification of the data read request has occurred. Data protection can thus be further reinforced to the effect that it is ensured that the user data to be read out and encrypted cannot be influenced by user data that is newly received at the same time. Consequently, this also ensures that the user data read out on the basis of the data read request must already have been present in the data storage system at the start of the readout. This can also be relevant for evidence purposes in particular, since technical evidence can be provided here if the time of the data read request or the start of the readout was recorded. In some embodiments, the user data is or will be cryptographically encrypted before or during its transmission from the access control device to the data storage system for storage there and/or cryptographic (ie digital) signature. This further increases data protection. In particular, in the case of encryption, the overall encryption protection is not limited to encryption when reading out, but the user data is already stored in encrypted form, so that even unauthorized physical access (attack) to the data storage system does not allow the information contained in the encrypted user data to be read out if the key required for decryption is not available to the attacker. The (authorized) decryption can then take place either during or after the readout of the user data stored in encrypted form as part of a read access, in particular in the second operating mode, or only in the reader device if it has the key required for decryption. This is therefore a further encryption level, which can be provided in addition to the above encryption as part of the second operating mode. In the case of the signature, the verification of the authorship and integrity of the user data protected in this way can be improved or made possible in the first place.

In some embodiments, the user data retrieved from the data storage system according to the data read request is encrypted and/or optionally the decryption of received encrypted user data to be written using the first cryptographic secret or a key derived therefrom by means of a symmetrical block encryption or block decryption or a symmetrical stream encryption or stream decryption. Possible symmetrical encryptions here are in particular encryptions according to the AES standard, for example AES ECB, AES XTS as block encryption or AES CBC as stream encryption.

In particular, to further strengthen the achievable data protection with regard to data integrity, the user data retrieved from the data storage system in accordance with the data read request can be encrypted and/or if necessary, the decryption of received encrypted user data to be written can occur using the first cryptographic secret or the key derived therefrom by means of an integrity-protecting symmetrical encryption. The use of AES GCM (AES Galois-Counter Mode) encryption is particularly suitable for this purpose.

In some embodiments, receiving user data from the host apparatus and transmitting it in unaltered or modified form to the data storage system for storage therein comprises: detecting an activation signal to initiate access to the data storage system; and at least one write session for writing the user data in the unmodified or modified form to the data storage system. Each of the at least one write sessions comprises: (i) in response to the detection of the activation signal, determining a free physical memory portion of the data storage system to be used during the write session for writing the data and selectively allocating this memory portion to this write session; (ii) protecting the user data using an access protection that protects it from later access by unauthorized different access sessions to the data storage system; and (iii) providing the access-protected user data in order to write them to the memory portion of the data storage system that is selectively assigned to the write session, or to cause this to be done. In this way, session-based data protection can be established.

The term "activation signal" as used herein means, in particular, a signal, such as a wired or wireless electrical, electromagnetic or optical signal, which is designed to be detectable by the entity executing the method, such as a corresponding configured data processing system, as an activation signal within the meaning of the method. Such an activation signal could be triggered in particular when switching on, when switching between different operating modes or can be activated when switching off a recording system or a data processing system itself executing the method and then be detected as mentioned under (i).

The term "free physical memory portion" as used herein is in particular a physical area of a storage system, such as one or more specific memory pages or memory blocks or the physical area of the storage system associated to a specific area of physical memory addresses, which is still "free" at the point in time under consideration. In this context, "free" is intended to mean that the free physical memory subarea is available for writing data, in particular because it has not yet been written to (at least since the memory was last reset) or because it is already released or available for other reasons there for overwriting existing data.

The term "write session-related data" as used herein, with respect to a particular write session, means data that is specifically associated with that write session to be output in its context for writing to the memory portion of the data storage system associated with the write session.

The method according to these (session-related) embodiments thus enables secure data storage in the data storage system, in which the access protection by the access control device has the particular effect that data written in the context of previous write sessions cannot be accessed or only after prior successful authorization.

By analogy, this can be compared to a mailbox, in which mail, such as letters, can be posted at various times, but when posting items of mail one cannot gain access to items of mail already in the mailbox from previous postings unless one is authorised, ie in possession of the mailbox key. Since the various write sessions are separated from one another by the occurrence and detection of at least one activation signal, it is sufficient in terms of data protection to prove that such an activation signal occurred and was actually or at least in all probability also detected in order to prove that the previously stored data was protected thereafter and thus also during any subsequent access session (e.g. for write access, read access or delete access).

The data written to the data storage system during an earlier write session can thus be access-protected in such a way that they can neither be viewed (in particular read), nor overwritten nor deleted from later (not appropriately authorized) access sessions, nor can their existence be ascertained.

Various variants and details of these embodiments are described in the German patent application DE 10 2021 131 424.0 of the present applicant, the content of this patent application in this context being fully incorporated herein by reference.

A second aspect of the solution relates to an access control device for secure access control to a data storage system, wherein the access control device is configured to carry out the method according to the first aspect.

In some embodiments, the access control device is structurally separate from the data storage system, in particular as a separate semiconductor component, in particular an integrated circuit. The data storage system and the access control device can then be (signally) coupled to one another either permanently or temporarily via a suitable data interface. The access control can in particular also be integrated in the data source, in particular the host apparatus, to provide the user data to be stored. This represents an opportunity to use data carriers that are already available, in particular standardized ones, such as conventional memory cards, memory sticks or other memory modules (in particular removable data carriers) in connection with the present solution, since the access control device is moved to the data source and therefore does not have to be included in the data carrier itself. The integration of the access control device into the data source can be implemented in particular in the sense of a permanent integration, for example by soldering an integrated circuit implementing the access control device into the data source (especially host apparatus).

In contrast, in some other embodiments, the access control device is integrated with the data storage system. The structural unit can in particular be embodied as a mobile removable data medium, for example as a memory module, for example a memory card, USB stick, flash memory module or mobile hard disk. In this way, a structural unit, in particular a mobile one, can be provided which, in addition to being able to store data, also already has its own data protection functionality made possible by the access control device. Corresponding data protection can also be easily implemented if the host apparatus itself does not have its own data protection functionality to protect the data it generates, such as camera images or sound recordings.

Such a unit can contain the access control device and the data storage system, in particular in the form of various individual semiconductor components (chips or chipsets), which are structurally combined to form the unit, for example as a multichip module, system-in-package (SIP) or integrated in a memory card or another memory module.

If the structural unit is designed as a removable data medium, this not only enables a temporary connection to the host apparatus as required, but also enables reads out of the user data stored in the data storage system regardless of the availability of the host apparatus, in particular at a different location. This is particularly advantageous when the host apparatus is a device that is permanently installed at a specific location and the readout is to take place at a different location. Then only the removable medium has to be removed from the host apparatus and can be brought to the location of the readout. The same applies in many cases even if the host apparatus itself is also mobile, such as in the case of a camera designed to be worn on the body of an emergency responder (so-called "body cam"). The camera can remain with the emergency services, while after an operation only the removable data medium (e.g. in the form of a memory card) can be removed and taken to another location for reading out and archiving the user data recorded and stored on the memory card.

A third aspect of the solution relates to a computer program or computer program product, comprising instructions which, when the program is executed by an access control device according to the second aspect, cause the latter to execute the method according to the first aspect.

The computer program can in particular be stored on a non-volatile data carrier. This is preferably a data carrier in the form of an optical data carrier or a flash memory module. This can be advantageous if the computer program as such is to be handled independently of a processor platform on which one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules. In particular, the modules can be configured or at least used in such a way that they are executed in the sense of distributed computing on different devices (computers or processor units that are geographically spaced apart and connected to one another via a data network. The access control device can accordingly have a program memory in which the computer program is stored. Alternatively or cumulatively, it can also be set up to access a computer program available externally, for example on one or more servers or other data processing units, via a communication connection, in particular in order to exchange data with it that are used during the course of the method or computer program or represent outputs of the computer program.

The features and advantages explained with respect to the first aspect of the invention also apply correspondingly to the further aspects of the invention.

A fourth aspect of the solution relates to a data archiving method for protected archiving of data from a data storage system that is access-protected by means of an access control device according to the second aspect, the data archiving method being executed by a data archiving device and including:

(a) transmitting a data read request to the access control device in order to request the latter to read and transmit user data stored in the data storage device to the data archiving device;

(b) forwarding between the access control device and the computer system of key exchange information used between the two as part of an exchange of a first cryptographic secret between the two (in particular the first secret or a partial secret required to generate the first cryptographic secret;

(c) as a user data recipient, receiving user data cryptographically encrypted as a function of the first cryptographic secret and read from the data storage system by the access control device in response to the data read request; and (d) archiving the received encrypted user data in a data archive.

The data archiving device thus carries out various sub-processes (a) to (d) as part of this method. Processes (a), (c) and (d) relate to an actual data archiving process in which, according to sub-process (a), user data to be archived is requested from the access control device in order to cause it to read the requested data from the data storage system and make it available in encrypted form. According to sub-process (c), the requested encrypted user data is then actually received and archived in sub-process (d), for example by storing it in a long-term data archive. It should be noted here that the data archived in this way are still encrypted and are therefore still protected without access to the cryptographic secret (key) required for their decryption and can therefore also be read by an operator of the data archive. The data archive can thus be regarded in particular as a type of archive in which data is archived while maintaining its secrecy, in order to be able to decrypt it in a targeted manner and thus make it accessible (for authorized parties, i.e. those equipped with the key) in a later case of need. Sub-process (b), on the other hand, has the function of upgrading the data archiving device as an intermediate station for the exchange of the first secret provided in the method according to the first aspect.

In some embodiments of the data archiving method, forwarding the key exchange information includes (directly or indirectly) forwarding identification or authentication information between the access control device and the computer system for identification or authentication of the access control device and/or of the data storage system versus the computer system and/or vice versa. The data archiving device can, if necessary, enable the identification or authentication of the computer system or the access control device that may be required within the scope of the method according to the first aspect (as an intermediate station in a communication path between the computer system and the access control device).

In particular, forwarding the identification or authentication information can also (directly or indirectly) forward challenge information originating from the computer system to the access control device or challenge information originating from the access control device to the computer system and/or have response information to the challenge information (cf. the corresponding embodiment of the method explained above according to the first aspect). The data archiving device can, if necessary, enable the identification or authentication of the computer system or the access control device that may be required within the scope of the method according to the first aspect by means of a challenge-response-scheme (as an intermediate station in a communication path between the computer system and the access control device).

In some embodiments of the data archiving method, this further includes (i) transmitting a key request message to the computer system, (ii) receiving from the computer system a cryptographic read key suitable for decrypting the archived user data; and (iii) decrypting the archived user data using the read key.

This therefore refers to the above case, where the archived data actually needs to be read (in plain text), which requires prior decryption. As part of the exchange of the first secret during the course of the method according to the first aspect, the computer system has received the read key required for decryption or at least the information required for its independent generation (partial secret), so that it can make the required read key available to the data archiving device.

Typically, however, a corresponding authorization for receiving the key will be required. Therefore, some embodiments of the data archiving method further include transmitting authentication information associated with the data archiving device or a user thereof to the computer system. This enables the computer system to verify the authorization of the data archiving device or its user for receiving the read key and to make the sending of the read key dependent on the success of the check, ie the authentication based on the authentication information.

In some embodiments of the data archiving method, the forwarding of the key exchange information includes forwarding a time signal representing a point in time. This enables the computer system to define time-dependent access to the archived user data by only transmitting the read key from the computer system to the data archiving device if a defined data retention period has not yet expired since that time.

A fifth aspect of the solution relates to a data archiving device for archiving protected data in a data archive, the data archiving device being configured to carry out the data archiving method according to the fourth aspect.

The data archiving device can be designed in particular as a mobile terminal. For example, it can be made possible for a data protection officer to carry out his task at various locations, if necessary (i) archiving data in the data archiving device, for example by establishing a local data connection between a storage medium containing the data storage system and the access control device with the data archiving device, and/or (ii) to read archived data in accordance with the data archiving procedure using the assigned read key received from the computer system and, if necessary, to evaluate it or make it accessible for judicial proceedings and the like.

In some embodiments, the data archiving device is integrated with the access control device of the second aspect. In particular, in addition to the data storage system and its assigned access control device, a data archive can also be implemented in the structural unit, in particular for protected long-term archiving of user data previously stored in the data storage system (particularly temporarily).

A sixth aspect of the solution relates to a computer program or computer program product, comprising instructions which, when the program is executed by a data archiving device according to the fifth aspect, cause the latter to execute the data archiving method according to the fourth aspect.

The computer program can in particular be stored on a non-volatile data carrier. This is preferably a data carrier in the form of an optical data carrier or a flash memory module. This can be advantageous if the computer program as such is to be handled independently of a processor platform on which one or more programs are to be executed. In another implementation, the computer program can be present as a file on a data processing unit, in particular on a server, and can be downloaded via a data connection, for example the Internet or a dedicated data connection, such as a proprietary or local network. In addition, the computer program can have a plurality of interacting individual program modules. In particular, the modules can be configured or at least used in such a way that they are executed in the sense of distributed computing on different devices (computers or processor units that are geographically spaced apart and connected to one another via a data network. The data archiving device can accordingly have a program memory in which the computer program according to thr sixth aspect is stored. Alternatively or cumulatively, it can also be configured to access, via a communication connection, an externa computer program which is available on one or more servers or other data processing units, for example, in particular in order to exchange data therewith, that are used during the execution of the method or computer program or represent outputs of the computer program.

The features and advantages explained with respect to the first aspect of the invention also apply correspondingly to the further aspects of the invention.

A seventh aspect of the solution relates to a data archiving system having an access control device according to the second aspect and a data archiving device according to the fifth aspect. The access control device and the data archiving device are configured here to interact according to the method according to the first aspect and the data archiving method according to the fourth aspect for archiving data in the data archive.

The features and advantages explained with respect to the first aspect of the invention also apply correspondingly to the seventh aspect of the invention.

BRIEF DESCRIPTION OF THE SEVERAL VIEWS OF THE DRAWINGS

Further advantages, features, and possible applications of the present invention result from the following detailed description in conjunction with the figures.

In the figures.

DETAILED DESCRIPTION

In the figures, the same reference numbers denote the same, similar or corresponding elements. Elements depicted in the figures are not necessarily drawn to scale. Rather, the various elements shown in the figures are presented in such a way that their function and general purpose can be understood by those skilled in the art. Unless expressly stated otherwise, connections and couplings between functional units and elements illustrated in the figures can also be implemented as indirect connections or couplings. In particular, functional units can be implemented as hardware, software or a combination of hardware and software.

Figure 1A:
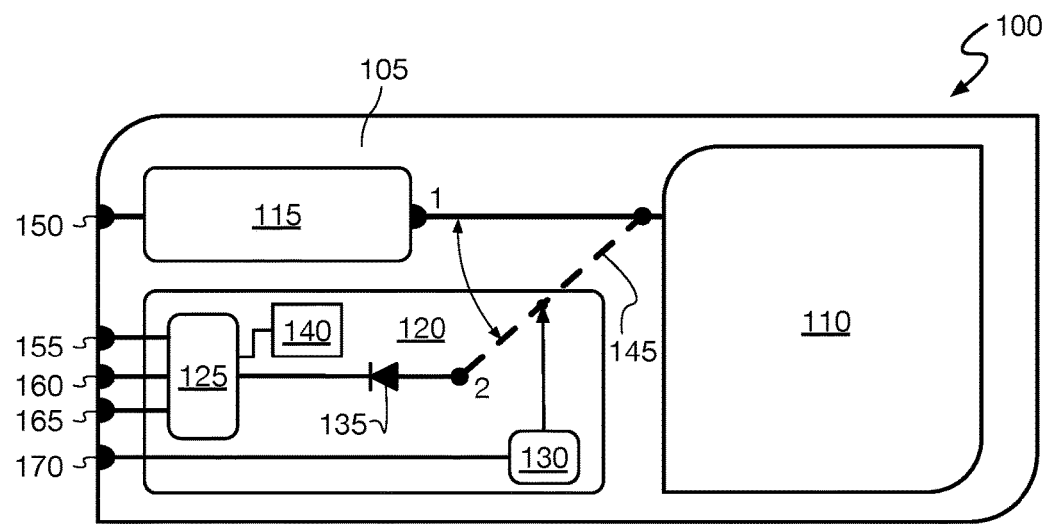
FIG. 1A schematically shows, according to an exemplary embodiment, a storage medium and a data storage system and a device for secure access control to the data storage system integrated therein.
Figure 1B:
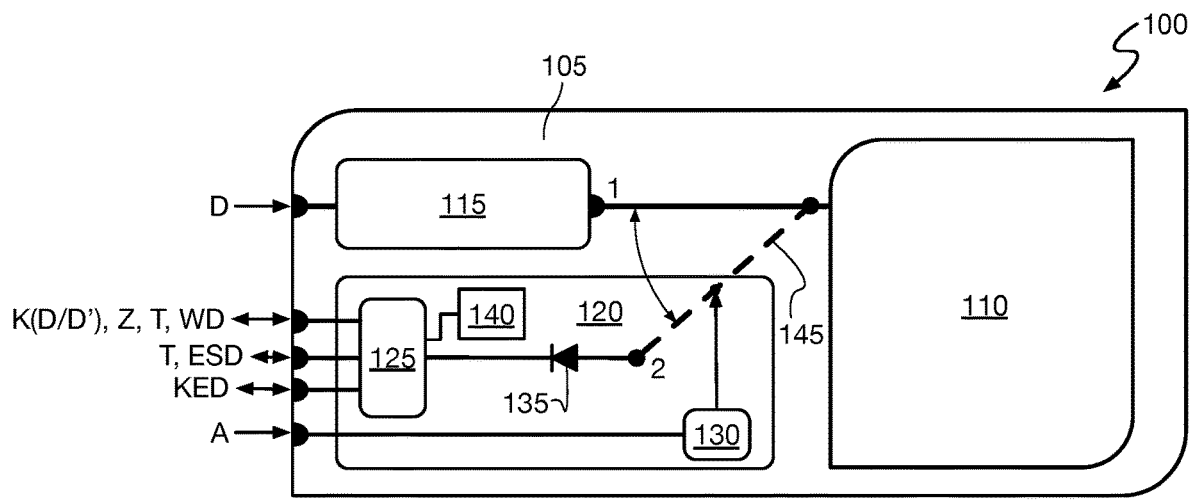
FIG. 1B shows the storage medium from FIG. 1A and information that can be exchanged or is to be exchanged via the interfaces thereof as part of accesses to the file storage system.

The storage medium 100 shown in FIGS. 1A and 1B according to an exemplary embodiment is a mobile removable data medium, in particular in the form of a memory card, which can be used for the secure storage of (user) data D, in particular recording data. The data D to be stored can in particular come from an external (host) device, such as a camera or an audio recording apparatus or any other data source. In the present example, a surveillance camera 205 is assumed to be the host apparatus (cf. FIG. 6).

The storage medium 100 has a substrate 105, in particular a semiconductor substrate such as a silicon chip, in which a data storage system 110, for example a flash memory (including a flash controller), a first interface logic 115 and a second interface logic 120 are integrated.

The first interface logic 115 and the second interface logic 120 together represent an access control device within the meaning of the invention.

Instead of integrating the first interface logic 115, the second interface logic 120 and the data storage system 110, a solution (not illustrated here) is also conceivable in which at least one of these elements is formed separately, so that the separate elements (for example as respective semiconductor chips) are interconnected, for example on a circuit board, or otherwise. In particular, it is possible to configure the two interface logics 115 and 120 together in one structural unit, for example as an integrated circuit, and the data storage system as at least one further structural unit, in particular as a memory chip. It is also conceivable to integrate the first interface logic 115 and/or the second interface logic 120 in a flash controller assigned to the flash memory, in particular (each individually or in combination) as a corresponding function block. The data storage system 110 can then contain the flash controller and the actual flash memory (eg of the NAND type), the flash controller in turn containing at least one, in particular each, of the interface logics 115 and 120. The interface logic 115 and 120 can each in particular based on program code and/or be implemented as a "hard-wired" circuit, e.g. in gate logic.

The storage medium 100 also has a switch 145, with the aid of which the data storage system 110 can be signal-connected, depending on the switch position (in switch position 1) to the first interface logic 115 and in switch position 2) to the second interface logic 120, in order to allow access from the respective interface logic 115 or 120 on the data storage system 110. Switch position 1 corresponds to a first operating mode and switch position 2 to a second operating mode of the access control device. The switch 145 is controlled by the second interface logic 120 and can in particular be embodied in a structural unit with it, for example as a transistor of a semiconductor circuit, in particular an integrated circuit, implementing the second interface logic 120.

The first interface logic 115 is connected to a first interface 155 of the storage medium 100 in order to exchange this data D with a first external data source or data sink 205 (cf. FIG. 2), in particular a host apparatus with which the storage medium 100 (for example by plugging it into a slot) can be connected. This can be unidirectional (specifically just receiving data) or bidirectional. In principle, the first interface logic 115 can be any data processing function, with even the trivial case being conceivable that it is only a transparent, ie non-data-changing, line. In many cases, the data processing function will be an interface function, such as that required to receive or send data D according to a (often standardized) data communication protocol, such as the Serial Peripheral Interface (SPI) or the proprietary SD-Bus protocol.

The second interface logic 120 has a plurality of external interfaces 155 to 170 for connecting the storage medium 100 as part of secure access to at least one second external data source or data sink (e.g. computer system 215 or user data receiver or data archiving device 210, see FIGS. 2-6), where this can and often will differ from the first data source or data sink 205. The first data source or sink 205 can and usually will communicate with the first interface logic 115. In contrast, the second external data source(s) or data sink(s) will typically communicate via the interface 155.

While the various interfaces 150 to 170 are defined and described separately herein, this does not necessarily mean that they are also physically implemented separately from one another. Rather, it is also possible that two or more, in particular all, of the interfaces 150 to 170 are only separated at the logical level, for example by different computer program code, but at the physical level they have or use the same interface device, e.g. electrically conductive contacts, optical or connections, wireless transceivers, conductor tracks, interface circuits, in particular processor circuits. Furthermore, it is possible and particularly advantageous with regard to the use of standardized interfaces and standard form factors for the storage medium 100 if the interfaces 150 to 170 on the physical level use such interfaces that are already provided as standard and are additionally implemented only on the logical level. In this way, the same physical connections can be used and the new functionalities of interfaces 150 to 170 can still be added.

The second interface logic 120 serves to provide secure access control to the data storage system 110. In order to be able to access the data storage system 110, the switch 145 must be set to switch position 2 (second operating mode). For this purpose, the switch 145 can be controlled by an authentication unit 130 of the second interface logic 120, the authentication unit 130 being configured to switch the switch 145 to switch position 2. In particular, the authentication unit 130 can be configured to move the switch 145 to switch position 2 only if it has previously received an authentication signal A at the interface 170 and successfully authenticated it. The authentication signal A can in particular carry a password or a PIN as information which is checked for correctness by the authentication unit 130 as part of the authentication.

If the switch 145 is in the switch position 2, a data transmission path is opened between the interface 160 and the data storage system 110, which is configured in FIG. 1A and FIG. 1B as a unidirectional data transmission path for (only) reading out data from the data storage system 110, which is marked here with the symbol of a diode 135, without a diode, in particular a semiconductor diode, necessarily having to be present for this. The data transmission path runs through an encryption unit 125 of the second interface logic 120, which is able to output via the interface 155 data that has been read out of the data storage system 110, to encrypt it cryptographically with one or more cryptographic secrets to protect it and/or to sign it, which secrets are stored in a secret memory 140 of the second interface logic 120, which is particularly secured (for example by a hardware security module). Direct or indirect communication between storage medium 100 and computer system 215, protected by end-to-end encryption based on the second secret, is quite generally opened up via the transmission path, via which encrypted ESD data can thus be exchanged.

The access control device 100 can in particular have a data processing unit with at least one processor and one or more executable computer programs which, when running, cause the access control device to execute a method for access control described herein according to the first aspect.

The storage medium 100 can in particular also have one or more, in particular bidirectional, command interfaces in order to control or configure the storage medium using commands and/or to issue commands for other units through the storage medium 100. In order to limit the complexity of the figures, such command interfaces are not shown specifically in the figures.

The functioning of the storage medium 100 within the scope of the solution described herein, in particular according to the method according to the first aspect, will be explained in more detail below with reference to FIGS. 1B and 2 to 6.

Figure 2:
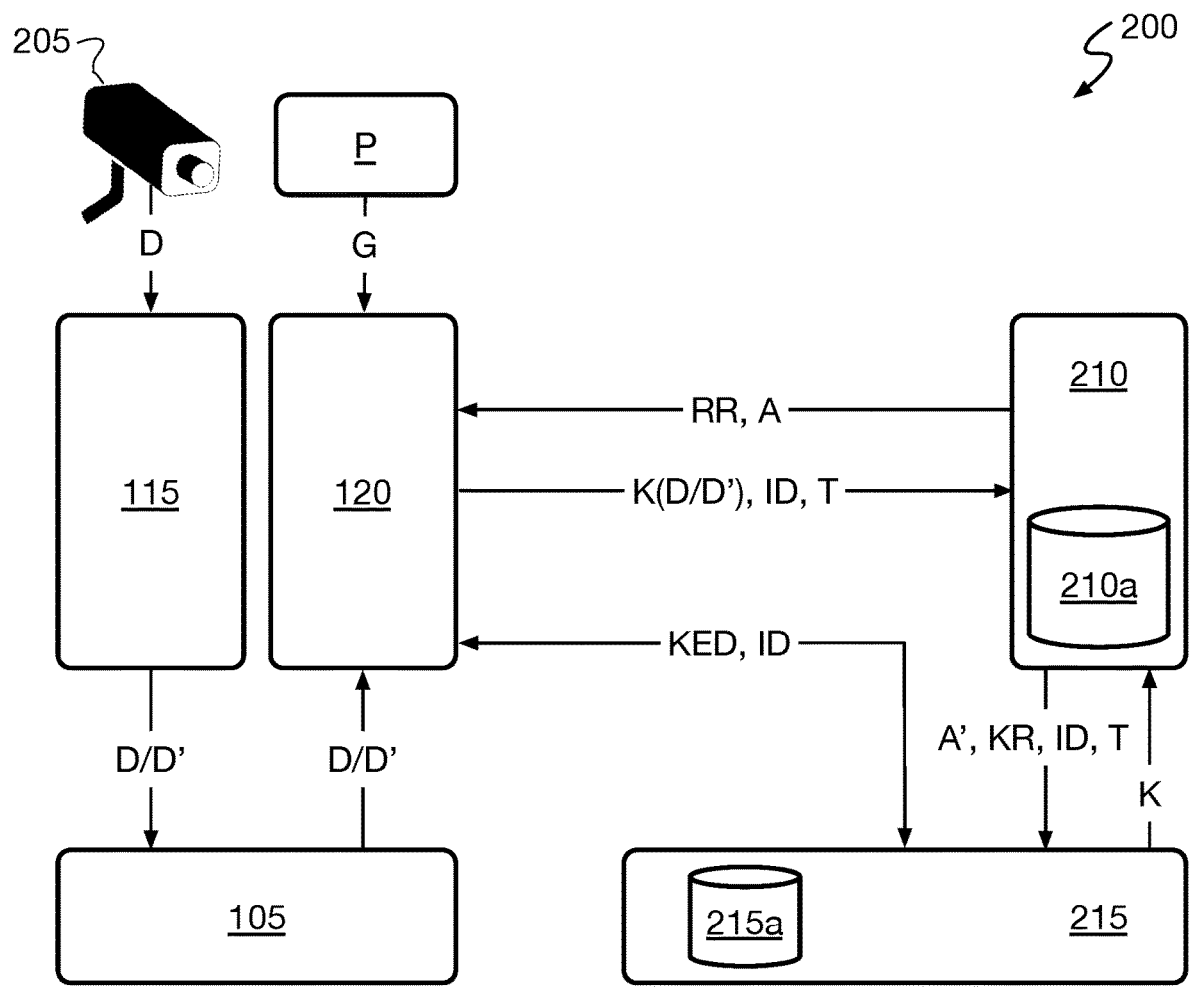
FIG. 2 shows a schematic illustration showing an example of a generalized embodiment of the solution in which various aspects of the invention described herein cooperate with each other.

FIG. 2 shows a first exemplary embodiment of the solution, in which in respective embodiments the method according to the first aspect, performed by the access control device 115/120, and the data archiving method according to the fourth aspect are performed by a data archiving apparatus 210 according to the fifth aspect. Overall, FIG. 2 shows an exemplary data archiving system according to the sixth aspect of the present solution. As part of the production P of the storage medium 100, a cryptographic secret G is securely stored in its secret memory 140, to which the cipher unit 125 has access. This cryptographic secret G (hereinafter referred to as "second cryptographic secret" or "second secret" for short) can in particular be a symmetric cryptographic key or a key of an asymmetric key pair, with the other key of the key pair being assigned to a computer system 215, as described below will be explained in detail. Thus, using the second secret G, communication between the storage medium 100 and the computer system 215 that is secured by means of encryption can be established.

When using the completed storage medium 100, it can be used in particular for storing recording data D of a host apparatus 205, such as a video surveillance system. For this purpose, the storage medium 100 can be connected to the host apparatus 205, for example by plugging it into a slot of the same.

When the host apparatus 205 is in recording mode, the storage medium or its access control device 115/120 is in its first mode of operation. The recording data D, in particular video or audio recordings, supplied by the host apparatus 205 are received as user data from the storage medium 100 via the interface 150. They can then optionally be modified in the first interface logic 115, for example compressed or decompressed or reformatted or recorded in order to obtain modified data D'. Other types of modification are also conceivable here. Depending on the case, the unmodified data D or the modified data D' are then stored in the data storage system 105 of the storage medium 100. The first operating mode is therefore used for receiving, possibly modifying, and writing user data D or D' to data storage system 105.

As part of the first operating mode, alternatively only as part of the second operating mode described below, a first cryptographic secret K is exchanged with the computer system 215, which can in particular be a key server, for example in a cloud environment. For this purpose, key exchange data KED is exchanged between the storage medium 100, in particular its second interface logic 120, and the computer system 215 in a manner that is cryptographically secured, in particular encrypted, using the second secret G. As part of this exchange, the storage medium 100 also communicates to the computer system 215 an identity information ID, on the basis of which the storage medium 100 is uniquely identifiable, at least in a given context such as here the management of recording data from one or more host apparatus 205 using a plurality of different storage media, but preferably even globally unique. Various possibilities for the exchange of the key exchange data KED are shown in the various embodiments explained with reference to the further figures. Therefore, instead of the general reference to key exchange data KED in FIG. 2, these figures each contain specific implementations for this, in particular in the form G(K), G(K,T) or G(K,Z,T).

Alternatively, the identity information ID can also have been made available to the computer system 215 independently in advance, for example as part of an initialization of the storage medium 100, so that the exchange of the identity information ID between the storage medium 100 and the computer system 215 shown in FIG. 2 is no longer required. The second secret G stored in the computer system 215 (in the symmetrical case) or the corresponding other key of the key pair belonging to G in the asymmetrical case is then assigned to the ID. Each storage medium can preferably only be registered once in the computer system at any given point in time, so that double registrations and associated data protection problems are avoided.

The first cryptographic secret K can be exchanged in particular by means of a known key exchange protocol, for example with regard to symmetric encryption "Merkle's Puzzle", (ii) with regard to asymmetric encryption the "Diffie-Hellman key exchange", or (iii) for key exchange and authentication in a decentralized network, the "Needham-Schroeder protocol", which can be used with regard to both symmetric and asymmetric encryption. The computer system 215 can have a database 215a for securely storing the cryptographic secrets, in particular K, which are available to it.

A user data receiver 210, such as a data archiving system, for example for long-term archiving of the recording data in a data archive 210a, can now send a data read request RR to the storage medium 100 in order to read the data D or D' stored therein or request, at least in part, an even further modified form possibly processed by the second interface logic 120. In order to qualify to the storage medium 100 as an authorized user data recipient 210, user data recipient 210 provides corresponding authentication information A via interface 170 to storage medium 100 and and forwards it to authentication unit 130, where authentication of user data recipient 210 or its data read request RR takes place based on the authentication information A.

If the authentication is successful, ie the user data receiver 210 is recognized as qualified by the authentication unit 130, this causes the storage medium 100 or its access control device 115/120 to switch to its second operating mode by switch 145 being transferred to its second switch position 2. In practical implementation, the switch can be implemented, for example, by a transistor or a transistor gate (eg CMOS gate). A purely logical switchover (implemented as part of a computer program) is also conceivable here, in particular if the switch 145 and the second interface logic 120 (which can also contain the switch 145 itself) are designed using a processor, for example integrated in a flash controller.

In the second mode of operation the access control device 115/120 is configured in such a way that, provided authentication is successful, it allows only read access (and thus neither write access nor delete access) to the data storage system 105, with this read access only being possible via the second interface logic 120.

In the case of a successful authentication, the data read request RR is satisfied by the requested data D/D' are read out of the data storage system 105 by the second interface logic 120, encrypted in the cipher unit 125 using the first secret K, in particular as part of a symmetrical encryption, and output at the interface 155 as encrypted read data K(D/D') in order to transmit them directly or indirectly, for example via a connected communication network, to the user data receiver 210. Along with the encrypted read data K(D/D') the identity information ID is also transmitted. This allows the user data receiver 215 to later request by using the identity information ID, specifically access to the cryptographic secret required for decrypting the read data K(D/D'), in particular K, from the computer system 215. Optionally, time information T can also be transmitted, which can have been received from storage medium 100 (not shown in the figures), in particular from a trustworthy external time information source, e.g. computer system 215, in particular via interface 160. The time information can in particular refer to a point in time when the data is saved or read out D/D' into and out of data storage system 110.

It is also conceivable that the user data receiver 210 is additionally or alternatively configured, independently of a simultaneous transmission of the encrypted read data K(D/D') to request the identity information ID from the storage medium 100, in particular from its access control device 115/120, and this in turn is configured to transmit the identity information ID to the user data receiver 210 in response to such a request. For the sake of clarity, this variant is not shown in FIG. 2 (and other figures).

The user data receiver 210 is thus able to archive the received encrypted data K(D/D'), but initially without being able to access the content itself due to the encryption. However, if the case arises that a reading of the read data K(D/D') is required, it is possible for an authorized party to receive the key (first secret K) required for decrypting the read data K(D/D') under certain conditions. This can be the case, for example, if the data is required for legal use and a correspondingly authorized user, for example a data protection officer or an authority or another person appointed by a court, has or receives authentication data A' with which a successful authentication on the computer system 215 is made possible as part of a key request KR, with which the identity information ID and possibly the time T are transmitted to the computer system 215 at the same time. In the case of a successful authentication based on A', the computer system 215 makes the requested key K available to the user data recipient 210, so that the data stored there in the data archive 210a D/D' can be read.

If the time T is used, the provision of the key K can also be made dependent on whether a specific time criterion with regard to the time T is met or not. In particular, the computer system 215 could check whether or not a predetermined expiry time has already elapsed since the time indicated by the time indication T, and only make the key K available if the expiry time has not yet expired. Thus, a limited period of validity for the data D/D' can be implemented. After the expiration time, the associated first secret K can also be destroyed.

Figure 3A:
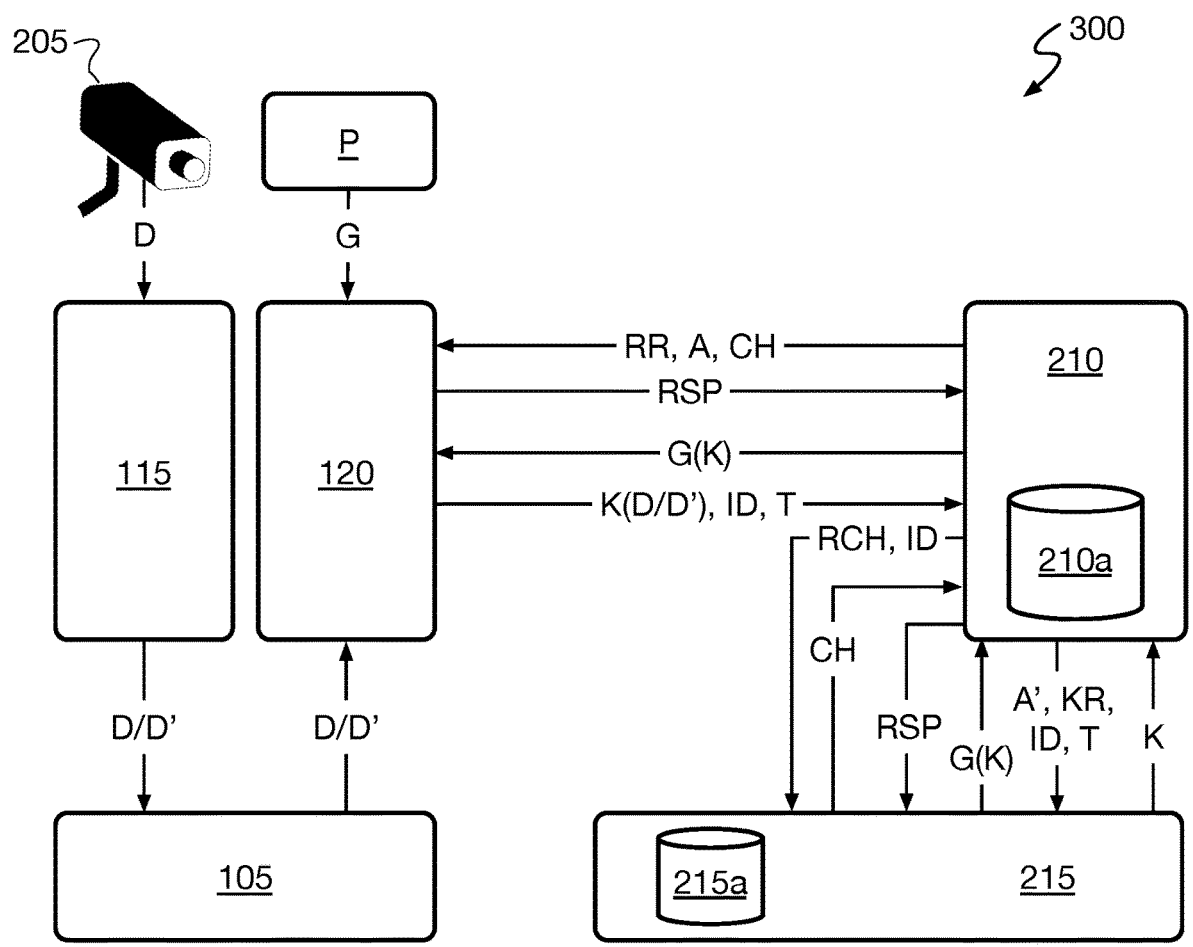
FIGS. 3A and 3B each show a schematic illustration to illustrate a respective further exemplary embodiment of the solution, in particular for "online variants"

Another embodiment 300 is illustrated in FIG. 3A, which is based on the embodiment 200 but modifies it in a few points. Only these modified points will be discussed below; the explanations already given for FIG. 2 also apply in other respects.

The embodiment 300 represents in particular a first "online variant" since the first secret K must be made available by the computer system 215 and is not generated or kept in the storage medium 100 itself from the outset.

In order to make the first secret available to storage medium 100, user data receiver 210 first requests challenge information CH (in the sense of a challenge-response scheme) by means of a corresponding request message RCH, for which purpose it sends to the computer system 215 the identity information ID of storage medium 100. This information can be transmitted in advance to the user data receiver 210, in particular by the storage medium 100 itself, or it can be known in some other way.

The computer system 215 then supplies the requested challenge information CH to the user data receiver 210, the challenge information CH being derived from the second secret, as will be explained in more detail below.

The user data receiver 210 then transmits the challenge information CH together with the request RR and the authentication information A to the storage medium 100. Using the second secret G available thereto, the storage medium 100 calculates response information RSP by applying it to the challenge information CH according to a predetermined method and sends this back to the user data receiver 210 for forwarding to the computer system 215. The response information RSP can be verified there using the second secret G. If the second secret is an asymmetric case, the second secret of the storage medium 100 and the second secret of the computer system 215 represent mutually corresponding keys of the same key pair. In the symmetric case both second secrets G are equal.

If the storage medium 100 has been successfully authenticated by the computer system 215 as the authorized recipient of the first secret K based on the verification of the response information RSP, this is encrypted with the second secret of the computer system 215 and is thus transmitted as G(K) directly or indirectly via the user data recipient 210, to the storage medium 100 in order to make the first secret available to it and thus to enable it to provide the data requested by the read request RR as encrypted data K(D/D'), as already described with reference to FIG. 2.

Figure 3B:
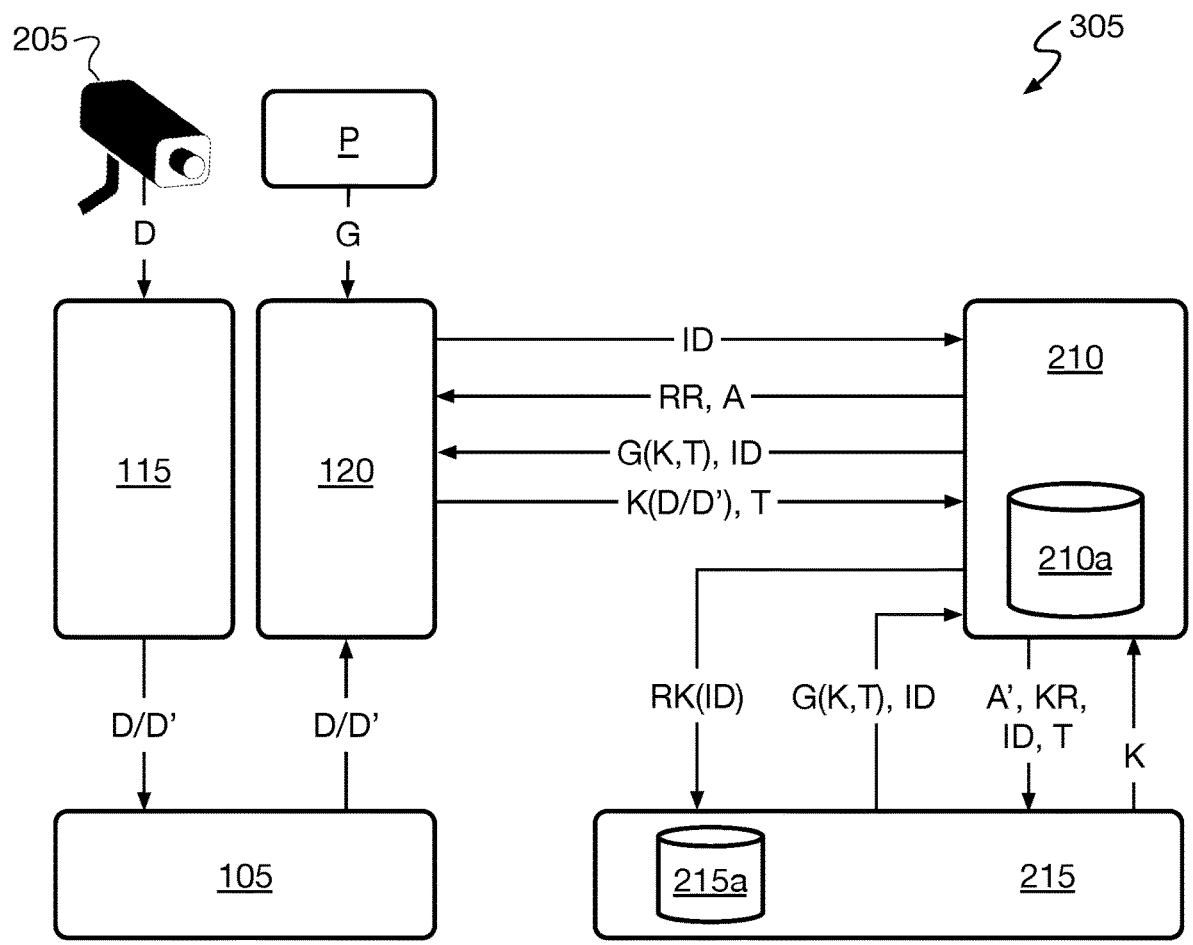

Another embodiment 305 is illustrated in FIG. 3B, which is based on the embodiment 200 but modifies it in a few points. Only these modified points will be discussed below; the explanations already given for FIG. 2 also apply in other respects.

The embodiment 305 represents in particular a first "online variant" since also in this case the first secret K must be made available by the computer system 215 and is not generated or kept in the storage medium 100 itself from the outset.

As part of the method 305, the identity information ID is transmitted by the storage medium 100 to the user data receiver 210, in particular before the encrypted read data K(D/D') and the time value T are later transmitted. The user data receiver 210 then transmits the ID as part of a secret request RK(ID) to the computer system 215 in order to cause it to generate the first secret K, retrieve it from a memory or obtain it in some other way and transfer it together with the time value T encrypted with the second cryptographic secret G as G(K,T) and the ID to the user data receiver 210, which in turn forwards G(K,T) to the storage medium 100 in order to make K and T available to it (the storage medium 100 can decrypt the encryption with G). Otherwise, method 305 corresponds to method 200.

Figure 4:
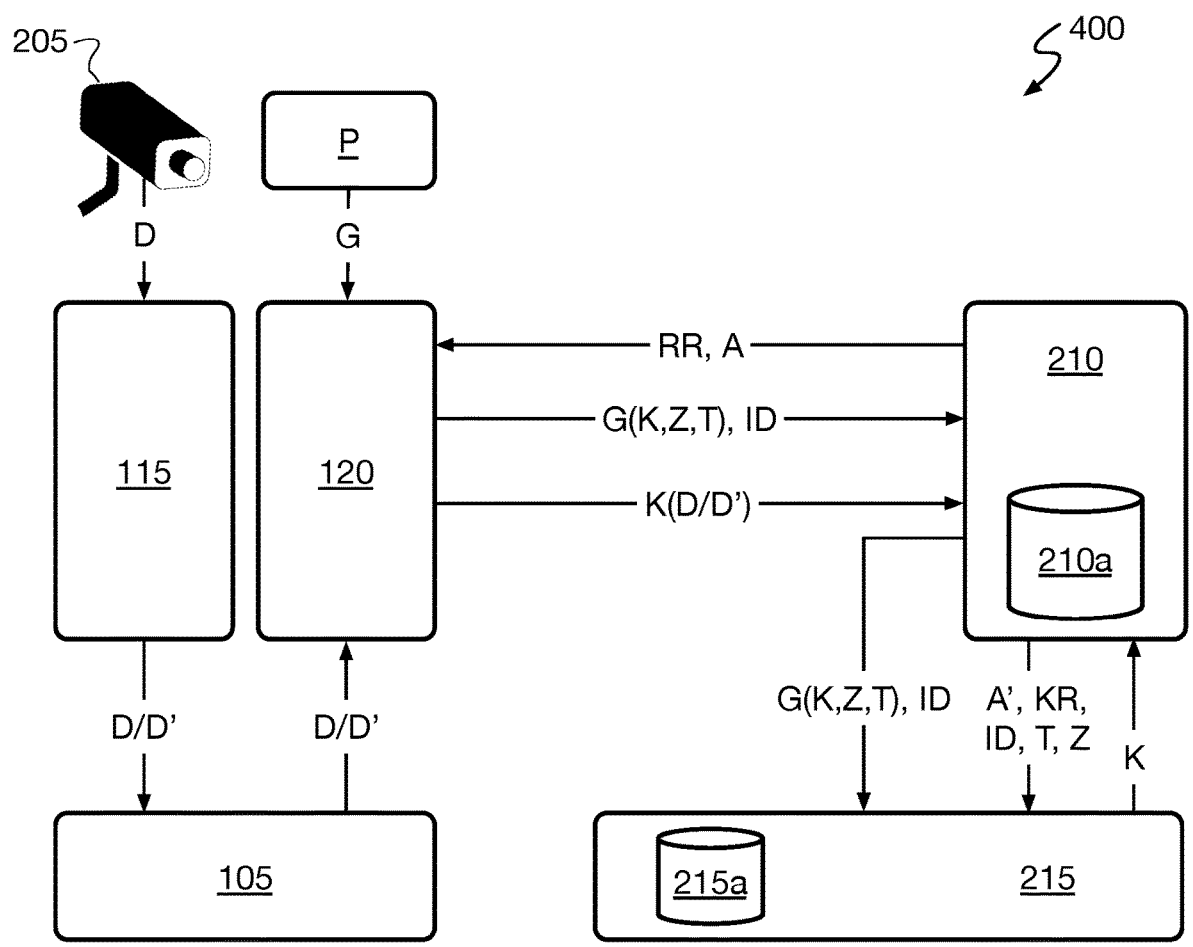
FIG. 4 shows a schematic illustration to illustrate a further exemplary embodiment of the solution, in particular for "offline variants"

Another embodiment 400 is illustrated in FIG. 4, which is also based on the embodiment 200 but modifies it in a few points. Only these modified points will be discussed below; the explanations already given for FIG. 2 also apply in other respects.

The embodiment 400 represents in particular an "offline variant" since the first secret K is initially made available here by the storage medium 100 itself without the involvement of the computer system 215.

At the latest after receipt of the data read request RR from user data receiver 210, storage medium 100 makes available via one of its interfaces, in particular interface 165, a cryptogram G(K,Z,T) created using the second secret G, which contains in encrypted form a first secret K generated by the storage medium 100 itself or previously stored therein, and optionally the time T and/or an index value Z that is uniquely assigned to the read request RR, so that each further read request receives a different index value Z. The cryptogram is transmitted to the user data receiver 210 together with the identity information ID and is forwarded by this to the computer system 215. Alternatively, it would also be possible to transmit the cryptogram to the computer system 215 without the user data receiver 210 being interposed. The cryptogram itself can also contain the identity information ID, insofar as it is ensured that the user data receiver 210 also receives this information ID in a form that it can read. The first secret K is thus available to the computer system 215 as usual, since it can decrypt the cryptogram using its second secret G.

As part of the transmission of the authentication data A' from the user data receiver 210 to the computer system 215 (cf. FIG. 2), the index value Z can optionally be transmitted in addition to the identity information ID and possibly the time T in addition to or instead of T. This is particularly advantageous in terms of securing or improving the reliability of the solution if the time source for providing the time T cannot be classified as sufficiently reliable, which can be the case in particular if the time source for the time T is or was not the computer system 215. If both T and Z are transmitted from the user data receiver 210 to the computer system 215, a consistency check can be carried out between the two pieces of information T and Z and, in the event of a significant deviation, an error can be detected and, if necessary, error measures can be initiated or warning information generated and, in particular on the computer system, these can be output and optionally communicated to the user data receiver 210.

Figure 5:
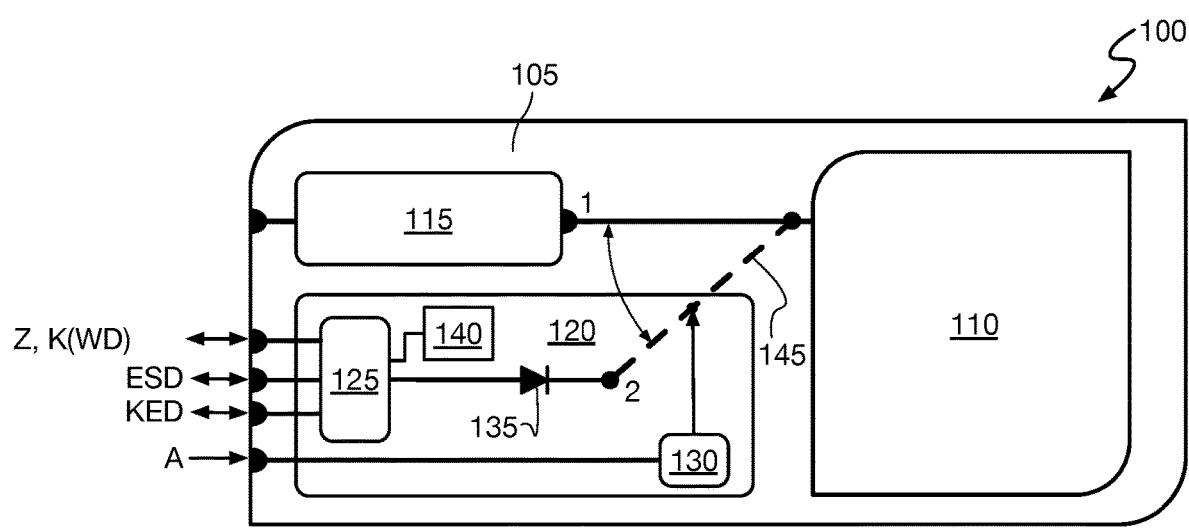
FIG. 5 schematically shows an illustration to illustrate a further exemplary embodiment of the solution, in particular for secure write access.

A further embodiment 500 is illustrated in FIG. 5, which can be implemented in particular cumulatively with an embodiment 200, 300 and 400 and relates to the reverse case, in which data is to be written to the storage medium 100 in a secure manner.

In contrast to FIG. 1B, from which FIG. 5 is obtained, the opposite unidirectional transmission path is provided there, so that here only write data WD can be written into the data storage system via the second interface logic 120, but these can not be read. The write data are received from the storage medium as cryptograms K(WD) encrypted with K and decrypted there using K and stored in the data storage system, optionally also encrypted directly as K(WD).

Figure 6:
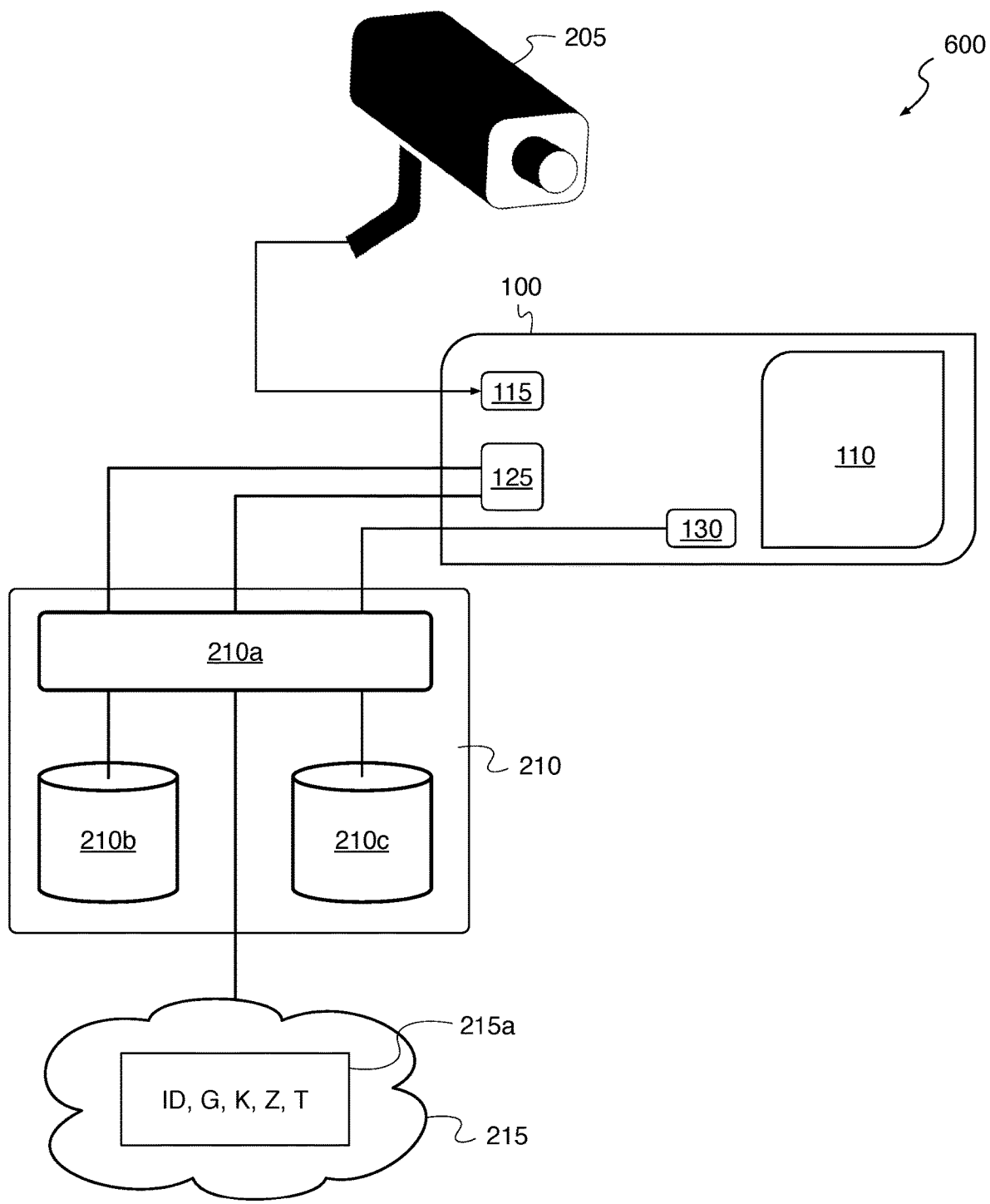
FIG. 6 schematically shows an exemplary embodiment of a data archiving device, in particular for recording data management, including recording system, storage medium and archiving system.

FIG. 6 shows schematically an exemplary embodiment of a data archiving system 600, in particular for recording data management, including recording system 205, storage medium 100, data archiving device as user data receiver 210 and computer system 215.

The data archiving device 210 serving here as user data receiver, which can in particular also coincide with the host apparatus 205, has an application for controlling the data archiving device 210, in particular in connection with the communication with the storage medium 100, an archive database 210b or data archive 210b for the long-term archiving of data and a memory 210c for the authentication information A.

The computer system 215 can, in particular, be or have a server that can be reached, in particular, via the Internet. As already explained, the computer system 215 can have a database 215A in which, in particular, the information exchanged, such as ID, G, K, Z and T, described in the context of the aforementioned solution, can be stored in order to have it available for the server.

While at least one exemplary embodiment has been described above, it should be appreciated that a large number of variations thereto exist. It should also be noted that the exemplary embodiments described only represent non-limiting examples, and are not intended to limit the scope, the applicability, or the configuration of the devices and methods described herein. Rather, the foregoing description will provide those skilled in the art with guidance for implementing at least one example embodiment, while understanding that various changes in the operation and arrangement of elements described in an example embodiment may be made without departing from subject matter respectively defined in the appended claims and its legal equivalents.

LIST OF REFERENCE NUMERALS 1 first switch position of switch 145
2 second switch position of switch 145
100 storage medium
105 substrate, in particular semiconductor chip
110 data storage system, in particular flash memory
115 first interface logic 120 second interface logic
125 cipher unit
130 authentication unit
135 symbol for unidirectional transmission path (diode symbol)
140 secret storage
145 switch for switching between operating modes
150 first interface, for use in the first operating mode
155 to 170 additional interfaces, especially for use in the second operating mode
200 first exemplary embodiment of the solution
205 (first) data source, in particular host apparatus, eg recording system
210 user data receiver, in particular data archiving device
210a application
210b data archive, in particular for long-term archiving of data
210c storage for authentication information A
215 computer system, especially server
215a database accessible by, or part of, computer system 215
300 embodiment of a first online variant of the solution
305 embodiment of a second online variant of the solution
400 embodiment of an offline variant of the solution
600 embodiment of a data archiving device including recording system, storage medium and archiving system
A authentication data of the user data recipient 210 for access to the storage medium
A' authentication data of the user data recipient 210 for querying K
CH challenge information
D (user) data not modified by first interface logic 115
D (user) data modified by first interface logic 115
P production of the storage medium or the access control device
ESD encrypted server data
K(D/D') with K encrypted read data (Encrypted Read Data)
WD write data for second operating mode
ID Identity information or identity of the access device and/or of the data storage system
K first cryptographic secret
G, G' respective second cryptographic secret
G(K) first secret K, encrypted with second secret G or corresponding key in the key pair
KED key exchange data
KR key request
RSP response Information (Response)
RR data read request (Read Request)
RK(ID) secret request for a specific ID as a parameter
T time signal or point in time
Z index value

What is claimed is:

1. A method for secure access control to a data storage system for a host apparatus by-an access control device, the method comprising:
as part of a first operating mode of the access control device, receiving user data (D) from the host apparatus and transmitting of the same in unchanged or modified form (D/D') to the data storage system for local storage;
exchanging a first cryptographic secret (K) with a computer system to enable data to be encrypted by the access control device as a function of the first cryptographic secret (K);
receiving a data read request (RR) for at least a portion of the user data stored in the data storage system;
in response to the data read request (RR), transitioning the access control device to a second mode of operation in which the access control device is configured to carry out read access but no write or delete access to the data storage system; and
in the second operating mode, retrieving user data (D/D') requested according to the data read request (RR) from the data storage system, encrypting the user data (D/D') using the first cryptographic secret (K) or a key derived as a function thereof in accordance with a key generation rule to produce encrypted user data (K(D/D')) and transmitting the encrypted user data (K(D/D')) to a predetermined user data recipient;
wherein as part of the method, the user data (D/D') is processed in such a way that the encrypted user data (K(D/D') transmitted as part of the second operating mode represent an information which is extractable therefrom for the user data recipient without any decryption of the encrypted user data (K(D/D')), which information represents an identity (ID) of the access control device and/or of the data storage system or which allows a deduction of the same.

2. The method of claim 1, wherein exchanging the first cryptographic secret (K) comprises transmitting identification or authentication information (ID) to the computer system for identifying or authenticating the access control device and/or of the data storage system with respect to the computer system.

3. The method of claim 2, wherein:
a challenge information (CH) defined by the computer system is received;
in response to the receipt of the challenge information (CH) and as a function of the challenge information (CH) and a predetermined second cryptographic secret (G), a response information (RSP) is generated according to a predetermined response generation rule and is transmitted to the computer system as part of the identification or authentication information; and
wherein the exchanging of the first cryptographic secret (K) further comprises:
receiving the first cryptographic secret (K) or a partial secret required according to a predetermined key exchange protocol for generating the first cryptographic secret (K) in a form that can be decrypted by the second cryptographic secret (G).

4. The method of claim 3, wherein the second cryptographic secret (G) is used as a key of an asymmetric key pair which is used:
(a) for generating the response data as a public key of the computer system as well as for decrypting the received first cryptographic secret (K) or partial secret as a private key of the data processing system and/or data storage system; or
(b) for generating the response data as a private key of the data processing system and/or data storage system and for decrypting the received first cryptographic secret (K) or partial secret as a public key of the computer system.

5. The method of claim 3, wherein the second cryptographic secret (G) is used as a symmetric encryption key used to decrypt the first cryptographic secret (K) or partial secret received and encrypted with the second cryptographic secret (G).

6. The method of claim 1, wherein exchanging the first cryptographic secret (K) comprises receiving a cryptogram containing the first cryptographic secret (K) or a partial secret required to generate the first cryptographic secret (K)

according to a predetermined key exchange protocol, the cryptogram being decryptable using the second cryptographic secret (G).

7. The method of claim 1, wherein exchanging the first cryptographic secret (K) comprises:
generating the first cryptographic secret (K);
encrypting read access data using a predetermined third cryptographic secret (G), the read access data being determined in such a way that they represent the first cryptographic secret (K) or a partial secret required according to a predetermined key exchange protocol for generating the first secret (K), and wherein the encrypted read access data can be decrypted by a fourth cryptographic secret (G') known to the computer system; and
transmitting the encrypted read access data and at least one identity (ID) of the access control device and/or of the data storage system to the computer system in order to provide it with the first cryptographic secret (K) and the identity (ID).

8. The method of claim 7, wherein the third cryptographic secret (G) and the fourth cryptographic secret (G') together form an asymmetric key pair and the third cryptographic secret (G) is used for encrypting the read access data as a private key of the access control device or as a public key of the computer system.

9. The method of claim 7, wherein the third cryptographic secret (G) and the fourth cryptographic secret (G') define the same cryptographic key (G) which is used as a symmetric key for encrypting the read access data.

10. The method of claim 7, further comprising:
receiving a time signal representing a current time;
wherein the read access data are determined in such a way that they also represent a current time indication represented by the time signal.

11. The method of claim 7, further comprising, in response to the data read request (RR):
redetermining the first cryptographic secret (K) so that it is uniquely associated with this data read request (RR);
setting an index value (Z) such that this index value (Z) is uniquely associated with this data read request (RR);
transmitting data representing the set index value (Z) to the user data receiver;
determining the read access data such that they additionally represent the set index value (Z); and
using the first secret (K) assigned to the current index value (Z) for encrypting the user data to be output in the second operating mode.

12. The method of claim 1, further comprising:
receiving a data write request for user data (WD) to be written to the file storage system;
in response to the data write request, transitioning the access control device to a third mode of operation in which the access control device is configured to provide write access to the data storage system, but no read access to user data previously written to it (D/D');
receiving user data (WD) to be written in an encrypted form based on the first cryptographic secret (K);
decrypting the received user data (WD) to be written using the first cryptographic secret (K) or a key determined as a function thereof according to a predetermined key generation rule; and
while the access control device is in the third operating mode, transmitting the user data (WD) to be written, decrypted in this way, in unmodified or modified form to the data storage system for local storage.

13. The method of claim 12, further comprising:
verifying the data write request;
wherein the transmission of user data (WD) to be written according to the data write request occurs in unmodified or modified form to the data storage system for local storage only if the data write request has previously been successfully verified.

14. The method of claim 12, wherein the user data (D/D', WD) before or during its transmission from the access control device to the data storage system for local storage is or will be protected with cryptographic encryption and/or signature.

15. The method of claim 12, wherein the encrypting the user data (D/D') retrieved from the data storage system (110) according to the data read request (RR) or the decrypting of received encrypted user data (WD) to be written using the first cryptographic secret (K) or a key derived therefrom takes place by a symmetric block encryption or block decryption or a symmetric stream encryption or stream decryption.

16. The method of claim 15, wherein the encrypting the user data (D/D') retrieved from the data storage system (110) according to the data read request (RR) or the decrypting of received encrypted user data (WD) to be written using the first cryptographic secret (K) or the key derived therefrom takes place by an integrity-protecting symmetrical encryption.

17. The method of claim 1, further comprising:
verifying the data read request (RR);
wherein the transmission of user data (D/D') requested according to the data read request (RR) only takes place if the data read request (RR) has previously been successfully verified.

18. The method of claim 17, wherein the verifying comprises:
receiving authentication data (A) of a device or a user of the device from which the data write request or the data read request (RR) originates;
wherein the verification is performed based on the received authentication data (A).

19. The method of claim 1, wherein:
the receiving of user data (D) from the host apparatus occurs via at least one input interface of the access control device; and
the transmission of the encrypted user data (K(D/D')) read out in the second operating mode to the predetermined user data recipient occurs exclusively via at least one output interface of the access control device that is different from each input interface.

20. The method of claim 1, wherein in the second mode of operation the access control device is or will be configured such that receiving further user data (WD) to be written into the data storage device by the access control device is prevented until the transmission of the encrypted read user data (K(D/D')) is performed based on the data read request (RR) to the user data recipient or a failed verification of the data read request (RR) has occurred.

21. The method of claim 1, wherein receiving user data (D) from the host apparatus and transmitting the same in unmodified or modified form (D/D') to the data storage system for local storage comprises:
detecting an activation signal to initiate access to the data storage system; and
at least one write session for writing the user data (D/D') in the unmodified or modified form (D/D') into the data storage system;

wherein each of the at least one writing sessions comprises:
in response to detecting the activation signal, determining a free physical memory portion of the data storage system to be used during the write session to write the data and selectively allocating that memory portion to that write session;
protecting the user data (D/D') using access protection that protects it from later access from other unauthorized access sessions to the data storage system; and
providing the access-protected user data in order to write them to the memory portion of the data storage system that is selectively assigned to the write session, or to cause this to be done.

22. An access control device for secure access control to a data storage system, the access control device comprising:
a processor; and
a memory having stored therein a set of instructions which, when executed by the processor, causes the processor to control access to a data storage system for a host apparatus by:
as part of a first operating mode of the access control device, receiving user data (D) from the host apparatus and transmitting of the same in unchanged or modified form (D/D') to the data storage system for local storage;
exchanging a first cryptographic secret (K) with a computer system to enable data to be encrypted by the access control device as a function of the first cryptographic secret (K);
receiving a data read request (RR) for at least a portion of the user data stored in the data storage system;
in response to the data read request (RR), transitioning the access control device to a second mode of operation in which the access control device is configured to carry out read access but no write or delete access to the data storage system; and
in the second operating mode, retrieving user data (D/D') requested according to the data read request (RR) from the data storage system, encrypting the user data (D/D') using the first cryptographic secret (K) or a key derived as a function thereof in accordance with a key generation rule to produce encrypted user data (K(D/D')) and transmitting the encrypted in this way user data (K(D/D')) to a predetermined user data recipient;
wherein as part of the method, the user data (D/D') is processed in such a way that the encrypted user data (K(D/D')) transmitted as part of the second operating mode represent an information which is extractable therefrom for the user data recipient without any decryption of the encrypted user data (K(D/D')), which information represents an identity (ID) of the access control device and/or of the data storage system or which allows a-clear deduction of the same.

23. The access control device of claim 22, wherein the access control device is designed in modular unit with the data storage system.

24. The access control device of claim 23, wherein the modular unit is designed as a mobile removable data carrier.

25. A non-transitory, computer-readable medium comprising instructions stored therein which, when executed by a processor of an access control device, causes the processor to control access to a data storage system for a host apparatus by:
as part of a first operating mode of the access control device, receiving user data (D) from the host apparatus and transmitting of the same in unchanged or modified form (D/D') to the data storage system for local storage;
exchanging a first cryptographic secret (K) with a computer system to enable data to be encrypted by the access control device as a function of the first cryptographic secret (K);
receiving a data read request (RR) for at least a portion of the user data stored in the data storage system;
in response to the data read request (RR), transitioning the access control device to a second mode of operation in which the access control device is configured to carry out read access but no write or delete access to the data storage system; and
in the second operating mode, retrieving user data (D/D') requested according to the data read request (RR) from the data storage system, encrypting the user data (D/D') using the first cryptographic secret (K) or a key derived as a function thereof in accordance with a key generation rule to produce encrypted user data (K(D/D')) and transmitting the encrypted user data (K(D/D')) to a predetermined user data recipient;
wherein as part of the method, the user data (D/D') is processed in such a way that the encrypted user data (K(D/D')) transmitted as part of the second operating mode represent an information which is extractable therefrom for the user data recipient without any decryption of the encrypted user data (K (D/D')), which information represents an identity (ID) of the access control device and/or of the data storage system or which allows a deduction of the same.

26. A data archiving system comprising:
an access control device; and
a data archiving device;
wherein the access control device provides secure access control to a data storage system for a host apparatus by:
as part of a first operating mode of the access control device, receiving user data (D) from the host apparatus and transmitting of the same in unchanged or modified form (D/D') to the data storage system for local storage;
exchanging a first cryptographic secret (K) with a computer system to enable data to be encrypted by the access control device as a function of the first cryptographic secret (K);
receiving a data read request (RR) for at least a portion of the user data stored in the data storage system;
in response to the data read request (RR), transitioning the access control device to a second mode of operation in which the access control device is configured to carry out read access but no write or delete access to the data storage system; and
in the second operating mode, retrieving user data (D/D') requested according to the data read request (RR) from the data storage system, encrypting the user data (D/D') using the first cryptographic secret (K) or a key derived as a function thereof in accordance with a key generation rule to produce encrypted user data (K(D/D')) and transmitting the encrypted user data (K(D/D')) to a predetermined user data recipient;
wherein as part of the method, the user data (D/D') is processed in such a way that the encrypted user data (K(D/D')) transmitted as part of the second operating mode represent an information which is extractable therefrom for the user data recipient-without any decryption of the encrypted user data (K(D/D')), which information represents an identity (ID) of the access control device and/or of the data storage system or which allows a-clear deduction of the same; and wherein the data archiving device provides protected archiving of data from the data storage system by:
- transmitting the data read request (RR) to the access control device in order to request the latter to read and transmit user data (D/D') stored in the data storage device to the data archiving device;
- forwarding between the access control device and the computer system of key exchange information used between the two as part of an exchange of a first cryptographic secret (K) between the two;
- as a user data recipient, receiving user data cryptographically encrypted as a function of the first cryptographic secret (K) and read from the data storage system-by the access control device in response to the data read request (RR); and
- archiving the encrypted user data (K(D/D')) in a data archive.

* * * * *